United States Patent [19]

Hughes et al.

[11] 4,274,508
[45] Jun. 23, 1981

[54] OUTLOOK LADDER SEAT

[76] Inventors: Tommy L. Hughes, c/o George Spector 3615 Woolworth Building, 233 Broadway; George Spector, 3615 Woolworth Building, 233 Broadway, both of New York, N.Y. 10007

[21] Appl. No.: 123,006

[22] Filed: Feb. 20, 1980

[51] Int. Cl.³ .............................................. E06C 7/16
[52] U.S. Cl. ..................................... 182/116; 182/129
[58] Field of Search ............... 182/129, 116, 115, 118, 182/119; 297/441, 274

[56] References Cited

U.S. PATENT DOCUMENTS

| 1,221,850 | 4/1917 | Erwin | 297/277 |
|---|---|---|---|
| 1,740,949 | 12/1929 | Luery | 297/441 |
| 2,723,674 | 11/1955 | Harris | 182/116 |
| 3,357,741 | 12/1967 | Vadner | 182/129 |
| 3,432,003 | 3/1969 | La Pierre | 182/129 |
| 3,472,339 | 10/1969 | Herrera | 182/129 |
| 3,485,320 | 12/1969 | Jones | 182/129 |
| 3,630,314 | 12/1971 | Bamburg | 182/116 |
| 3,967,694 | 7/1976 | Woolfolk | 182/108 |
| 4,045,040 | 8/1977 | Fails | 182/118 |

Primary Examiner—Reinaldo P. Machado

[57] ABSTRACT

A seat for a hunter looking out for game; the seat being at a top of a collapsible frame including a ladder, the frame being steadied by guylines to the ground, the seat including storage space and bags for guns, ammunition and the like, and the seat being enclosed under a removable, transparent tent for use in case of rain.

3 Claims, 3 Drawing Figures

U.S. Patent   Jun. 23, 1981   4,274,508
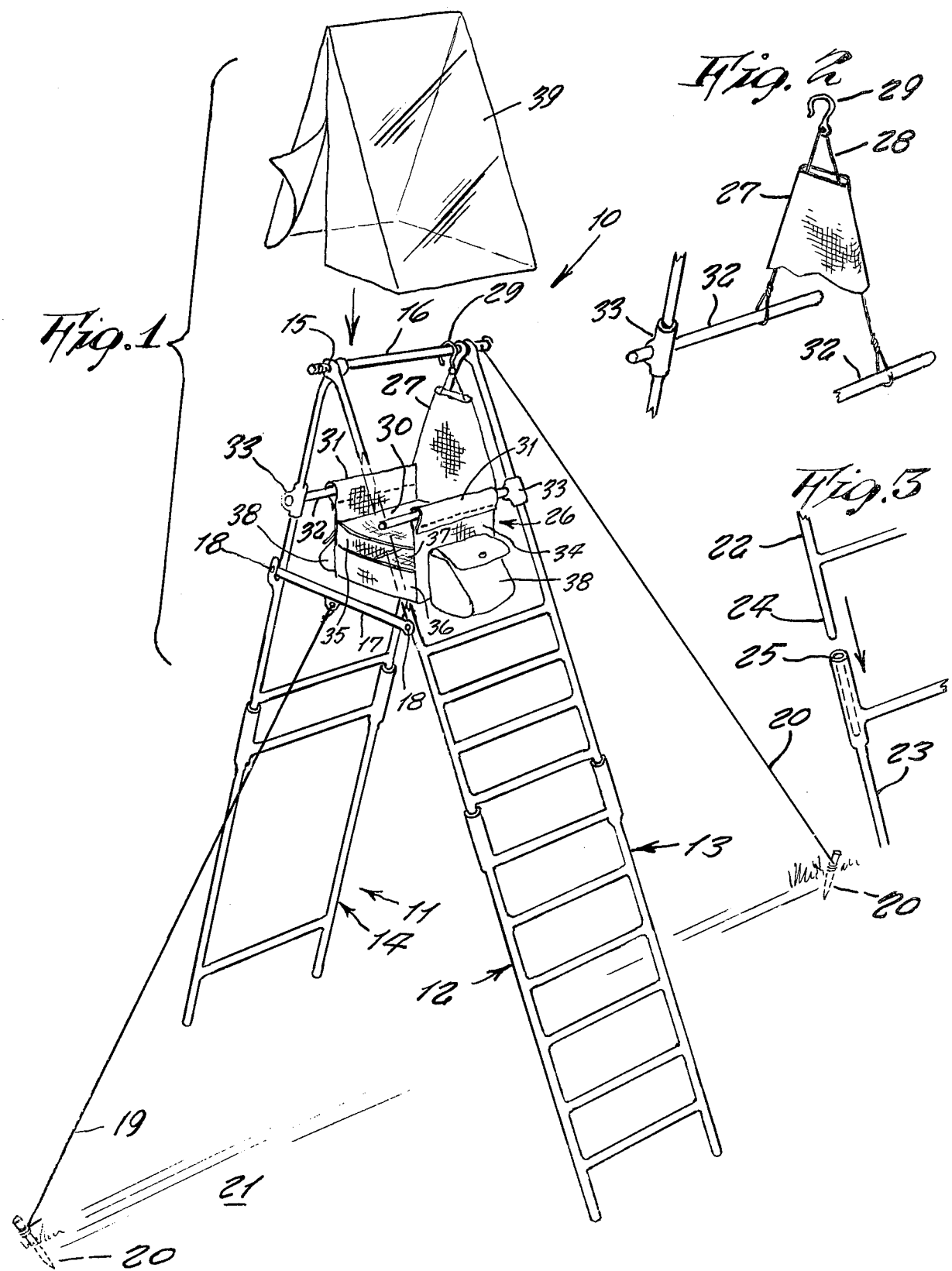

OUTLOOK LADDER SEAT

This invention relates generally to hunters' equipment.

A principal object of the present invention is to provide a comfortable seat from which a hunter can look out for passing game the seat being located at a high elevation in order that he can see a far distance above low brush, and other obstructions, and the device being collapsible so that the hunter can conveniently pack it on his back when walking into a field, woods or other place for hunting game.

Another object is to provide an outlook ladder seat wherein storage space and bags around the seat hold all his ammunition guns and food and other necessities so that he does not have to go down and up the ladder often, and can stay aloft which watching for game.

Still another object is to provide an outlook ladder seat which is easily and quickly enclosed under a transparent tent in case of a rain, so as to keep the hunter conveniently dry which still perched on the seat.

FIG. 1 is a perspective view of the invention, showing a design in which a triangular framework is used for greatest strength and stability against any sway, the seat being suspended from the top cross brace, and made of canvas with storage compartment underneath and bags on each side, the seat back being sleeved around the suspension cables for flexible comfort against a back, the framework consisting of interfitted parts so to be quickly and easily assembled together and make a small pack when carried through a woods, the ladder being only on one side to save weight, the canvas seat likewise being light weight, guy lines going front and rearward so to hold the framework erected, and a transparent plastic tent being fitted over the framework top in case of rain to protect the hunter, a cross brace between the framework legs serving as a foot rest for the seated hunter.

FIGS. 2 and 3 show detail constructions of the device.

Referring now to the drawing in greater detail, the reference numeral 10 represents an outlook ladder seat according to the present invention, wherein there is a collapsible frame 11 of A-shape so to be very sturdy against any sway, the frame being made of tubular aluminum so to be strong and lightweight. It includes a leg 12 that includes a ladder 13, and a leg 14 that serves as a brace for the leg 12. The upper ends of legs 12 and 14 have holes 15 for a steel cross rod 16 to extend therethrough and pivotally hold the leg ends together. A cross brace 17 extends horizontally between the legs and is bolted thereto by bolts 18 so that the frame is rigid.

A pair of thin, strong steel wires guy-lines 19 and 20 secure the upstanding, erected frame from toppling over. One guy-lines is attached to a center of the cross brace 17 and the other is attached to an end of the cross rod; the opposite ends of the guy-lines being tied around stakes 20 driven into the ground 21.

In order that the frame can be easily transported in a small compact manner, each leg 12 and 14 is comprised of an upper section 22 and a lower section 23 that interfit by means of a downward end of upper section pipe 24 removable sliding into a socket 25 at an upper end of the lower section.

A seat 26 made of foldable, strong canvas, is supported at the top of the frame. The seat includes a tubular backseat 27 as shown in FIG. 2 so that a nylon rope 28 insert therethrough, is attached to a hook 29 suspended from the cross rod 16, the backrest being stitched to seat portion 30 stitched also to loops arm rests 31 through which tubular aluminum bars 32 are fitted and secured at opposite ends in brackets 33 mounted on the legs 12 and 14. The arm rest canvas 34 extends downward and under the seat portion 30 in a spaced relation so as to form a storage space 35. A low front panel 36 forms a front wall for the space 35 and a lower edge of the back rest is stitched to the rear edge of the canvas 34 where it loops under the seat portion so that the storage space has a single access opening 37 above the panel 36. Supply bags 38 are attached to each side of the arm rest canvas 34.

In use, the hunter climbs up the ladder 13, steps on the cross brace 17 and sits on the seat.

In case of a rain, a triangular shaped, transparent plastic tent 39 fits over a top, correspondingly triangular end of the frame 11 so to keep the hunter and seat dry, while he can still look through the tent watching for game.

What is claimed as new, is:

1. An outlook ladder seat, comprising in combination, a collapsible A-frame made of tubular aluminum one leg of said A-frame including a ladder, and a seat suspended from a top of said A-frame, a triangular tent removably fitted over a top of said A-frame enclosing said seat from overhead rain.

2. The combination as set forth in claim 1, wherein said seat is made of canvas, including a backseat, seat portion, a storage space under said seat portion and supply bags on each side.

3. The combination as set forth in claim 2, wherein a front guy line and a rear guy line from an upper portion of said frame extend to stakes on a ground.

* * * * *